(12) United States Patent
Mayer (10) Patent No.: US 6,261,452 B1
(45) Date of Patent: Jul. 17, 2001

(54) LAMINAR FLOW COLLAR FOR USE IN A WASTEWATER MANAGEMENT SYSTEM

(75) Inventor: Robert B. Mayer, Manassas, VA (US)

(73) Assignee: American Manufacturing Company, Inc., Manassas, VA (US)

( * ) Notice: Subject to any disclaimer, the term of this patent is extended or adjusted under 35 U.S.C. 154(b) by 0 days.

(21) Appl. No.: 09/471,610

(22) Filed: Dec. 23, 1999

(51) Int. Cl.$^7$ ................................................ B01D 21/24
(52) U.S. Cl. .................. 210/256; 210/299; 210/416.1; 210/498; 210/532.2; 417/422.14
(58) Field of Search .................................. 210/256, 258, 210/299, 416.1, 498, 532.2, 541; 417/423.3, 423.14

(56) References Cited

U.S. PATENT DOCUMENTS

| | | |
|---|---|---|
| Re. 32,312 | 12/1986 | Crates et al. . |
| 2,173,932 | 9/1939 | Buckley . |
| 2,605,220 | 7/1952 | Logan . |
| 4,439,323 * | 3/1984 | Ball ................................. 210/532.2 |
| 5,186,821 | 2/1993 | Murphy . |
| 5,242,584 * | 9/1993 | Hoarau ............................. 210/299 |
| 5,262,065 * | 11/1993 | Hansen ........................... 210/416.1 |
| 5,417,553 * | 5/1995 | Gibson et al. ................... 417/423.3 |
| 5,492,635 * | 2/1996 | Ball ................................. 210/532.2 |
| 5,569,387 * | 10/1996 | Bowne et al. ................... 210/532.2 |
| 5,635,064 * | 6/1997 | Bovington ....................... 210/532.2 |
| 5,639,366 * | 6/1997 | Bazell et al. .................... 210/416.1 |
| 5,690,824 * | 11/1997 | Stuth ............................... 210/416.1 |
| 5,779,896 * | 7/1998 | Nurse, Jr. ......................... 210/532.2 |
| 5,985,139 * | 11/1999 | Zoeller ............................. 210/532.2 |

FOREIGN PATENT DOCUMENTS

29668 * 11/1903 (CH) .

OTHER PUBLICATIONS

Steele & McGhee "Water Supply and Sewerage" 5th ed p. 210, 1979.*
Streeter & Wylie "Fluid Mechanics" 8th ed p. 187, 1985.*
Linsley & Frazzini "Water Resources Engineering" 3rd ed p. 434 and 436, 1979.*

* cited by examiner

Primary Examiner—Christopher Upton
(74) Attorney, Agent, or Firm—McGuireWoods LLP (57) ABSTRACT

A laminar flow collar for use with an effluent pump in a septic system. The laminar flow collar is a cylinder having a closed bottom and an open top portion. The laminar flow collar includes a plurality of holes drilled about the periphery of the cylinder at a certain distance from the bottom. The laminar flow collar sits on the bottom of the tank and the plurality of holes are positioned at a certain height from the bottom of the septic tank and below the surface of the effluent so as not to draw in "scum" floating on the top of the septic tank. The plurality of holes are engineered to match the pump flow so that flow into the collar is laminar, thereby avoiding turbulence in the tank which would otherwise stir up the sludge at the bottom of the tank. The effluent pump is inserted into a second cylinder which is placed within the laminar flow collar.

18 Claims, 5 Drawing Sheets

FIG. 5

LAMINAR FLOW COLLAR FOR USE IN A WASTEWATER MANAGEMENT SYSTEM

BACKGROUND OF THE INVENTION

1. Field of the Invention

The present invention relates generally to a wastewater management system which maintains a laminar flow of wastewater (e.g., effluent) in a septic system and, more particularly, to a wastewater management system having a laminar flow collar which maintains a laminar flow of effluent within the septic system prior to discharging into an absorption field.

2. Background Description

In the absence of conventional public wastewater disposal and treatment systems, it is not uncommon for residential and small businesses to use on-site wastewater management systems. Typically, these wastewater management systems include a septic tank, and under certain conditions may additionally include a pump tank for discharging septic effluent into an absorption field.

In one such conventional system, wastewater flows into and out of the septic tank via baffled input and output pipes. These baffled input and output pipes slow the flow of water and prevent sewage from flowing directly through the septic tank. In the septic tank, solids are settled on the bottom of the tank while lighter particles including grease and foam float to the surface and form a layer of scum. The solid material in the septic tank is then broken down via a bacterial action.

The septic effluent may then be directed into the absorption field by gravity or, alternatively, may flow into a pump tank which doses the absorption field with the septic effluent. However, it is not uncommon for the solid waste to also flow into the pump tank. This usually occurs when the septic tank overflows due to high volume use and the like, and usually occurs despite the fact that baffles are positioned at the output of the septic tank. Similar to the septic tank, once the septic effluent including the solid waste flows into the pump tank, the solids settle on the bottom of the tank while lighter particles including grease and foam float to the surface and form a layer of scum.

A liquid pump within the pump tank (or septic tank) then provides a means for discharging the effluent into the absorption field. However, current systems have a tendency to create turbulent conditions within the tank (either a pump tank or a septic tank or the like) during the dosing process. These turbulent conditions, in turn, disturb the solid waste at the bottom of the pump tank as well as the scum on the surface of the effluent at the top of the tank such that the solid waste and the scum usually enter the intake ports of the pump. This leads to clogging of the pump which, in turn, may lead to a failure of the pump which would greatly increase the cost of maintenance of the wastewater management system. It is also noted that the efficiency of the system is also greatly reduced.

Solid pumps may also be used to discharge the septic effluent from the tank into the absorption field. However, solid pumps are not very efficient and cannot reach high heads. Thus, multiple stations or pump tanks are needed when using solid pumps, which greatly adds to the cost of the wastewater management system. Thus, the use of multiple stations or pump tanks is very expensive and still is not as efficient as the use of liquid pumps.

By way of example, U.S. Pat. No. Re. 32,312 to Crates et al. disclose an inlet and outlet baffle structure for sewage treatment tanks. The structure includes a septic tank 'A' which has opposing arcuate walls. An inlet 20 and an outlet 40 are disposed within the opposing arcuate side walls. The inlet includes first, second and third portions 60, 70 and 80. Incoming raw sewage is received in the first portion 60 and drops through the second portion 80. The sewage is slowed by the third portion 90 which absorbs some of the kinetic energy of the sewage. The reduced velocity reduces the turbulence in the tank; however, it appears that there still may be some turbulence still present in the tank.

As another example, U.S. Pat. No. 2,605,220 to R. P. Logan discloses an anaerobic digester including a closed tank with inlet and outlets. A propeller 23 is located within an upward extending tube 24. The propeller 23 violently agitates the fluid within the tank.

Moreover, U.S. Pat. No. 5,186,821 to Murphy discloses a tank having an influent delivery system 12 which delivers influent through a pipe tee 20 and pipe section 21 into substantially the bottom section of a collector 28. A circular partition 26, being larger in circumference than collector 28, creates a pre-stratification zone 27. Multiple air diffusers 30 are connected to a drop pipe 31 with the upper end of drop pipe 31 being connected to a conventional air compressor 58 which is mounted within the manway 56. A floating decanter base section 35 and a submersible motor 36 and suction pump 38 are provided in the tank 11.

What is needed is a wastewater management system that is capable of using a liquid pump having high head capabilities without being clogged by solid waste during the dosing process. This system would also control the effluent flow into the absorption field such that the absorption field is utilized in an efficient manner thereby providing enhanced effluent quality.

SUMMARY OF THE INVENTION

It is therefore an object of the present invention to provide a wastewater management system that prevents turbulence of effluent within either a septic tank or a pump tank or the like.

It is a further object of the present invention to provide a wastewater management system that prevents a dosing pump from being clogged with solid waste or scum during discharge of effluent into an absorption field throughout a range of effluent flows.

It is also a further object of the present invention to provide a wastewater management system that includes a laminar flow collar for housing a dosing pump having high head capabilities and which further maintains a laminar flow of the effluent throughout a range of effluent flows.

It is a also an object of the present invention to provide a wastewater management system that provides a cooling tower for cooling a dosing pump.

According to the invention, there is provided a laminar flow collar which prevents turbulence from being created in a septic system throughout a range of effluent flows. That is, the laminar flow collar of the present invention maintains a laminar flow of effluent within the septic system. The laminar flow of effluent in the septic system prevents a dosing pump (preferably a liquid pump) from becoming clogged which may lead to failure of the dosing pump.

The laminar flow collar includes a cylinder having a closed bottom and an open top portion. The cylinder further includes a plurality of holes positioned about the periphery of the cylinder at a certain distance from the bottom. The diameter and number of holes within the cylinder in combination with the flow rate of the dosing pump maintains the laminar flow of the effluent within the septic system and preferably within either a septic tank or a pump tank or the like. The dosing pump is inserted into a pump cylinder which is placed within the laminar flow collar cylinder. The flow collar acts as a receptacle and a guide tube for the placement of the dosing pump within the tank. This pump cylinder is open at the bottom for the pump intake and at the top terminates in a frustro-conical fitting that connects to an effluent pipe. The laminar flow collar assembly sits on the bottom of the tank and the plurality of holes are positioned between the solid waste (e.g., sludge) which has settled at the bottom of the tank and the scum floating near the top of the tank.

The plurality of holes are engineered to match the pump flow so that effluent flowing into the collar is laminar, thereby avoiding turbulence in the tank which would otherwise stir up the sludge at the bottom of the tank. This prevents the solids and scum from entering the input ports of the pump which may clog the pump and lead to a pump failure. Also, the pump cylinder also provides a reduced volume which increase the flow rate of the effluent at the bottom of the flow collar cylinder. This ensures that particulate matter will not accumulate at the bottom of the flow collar cylinder thus reducing the efficiency of the dosing pump.

BRIEF DESCRIPTION OF THE DRAWINGS

The foregoing and other objects, aspects and advantages will be better understood from the following detailed description of a preferred embodiment of the invention with reference to the drawings, in which:

FIG. 3b shows a cross section of the laminar flow collar of the present invention along lines 3—3 of FIG. 3a;

DETAILED DESCRIPTION OF A PREFERRED EMBODIMENT OF THE INVENTION

The present invention is directed to a wastewater management system having a laminar flow collar which maintains a laminar flow of effluent within the septic system prior to discharging into an absorption field. The present invention further has the advantage of preventing turbulence of effluent within either a septic tank or a pump tank in order to prevent solid waste or scum from clogging the dosing pump throughout a range of effluent flows. This allows for maximum settling of solid material at the bottom of the septic tank or pump tank.

In order to accomplish the above objectives, the present invention includes a laminar flow collar cylinder having a plurality of holes positioned about the periphery thereof at a certain distance from the bottom. The plurality of holes positioned about the periphery of the laminar flow collar cylinder are engineered to match the pump flow rate so that effluent flowing into the laminar flow collar cylinder is laminar throughout a range of effluent flows. This avoids turbulence in the tank which would otherwise stir up the sludge at the bottom of the tank. This further allows for maximum settling of the sludge at the bottom of the tank.

Positioned within the laminar flow collar cylinder is a pump cylinder which houses a dosing pump. In the preferred embodiments, the dosing pump is a liquid pump.

For illustrative purposes only a single embodiment of the laminar flow collar will be described herein with reference to FIGS. 14. However, it will be understood from the disclosure that the laminar flow collar of the present invention can be made of many materials and engineered to accommodate various wastewater effluent flow rates and the like as provided in the examples below. Therefore the specific dimensions of the laminar flow collar, including length, width, shape and other variables and quantities specified herein may vary with the type and size of the laminar flow collar being used with the system contemplated herein. Therefore, numbers and dimensions specified herein are not to be construed as limitations on the scope of the present invention, but are meant to be merely illustrative of one particular application of the present invention. It is also well understood by one of ordinary skill in the art that an important feature of the laminar flow collar of the present invention is to maintain a laminar flow of effluent in a septic system at various designed flow rates thereby preventing solid waste and the like from clogging the inlet ports, impellers and the like of the dosing pump.

Figure 1:
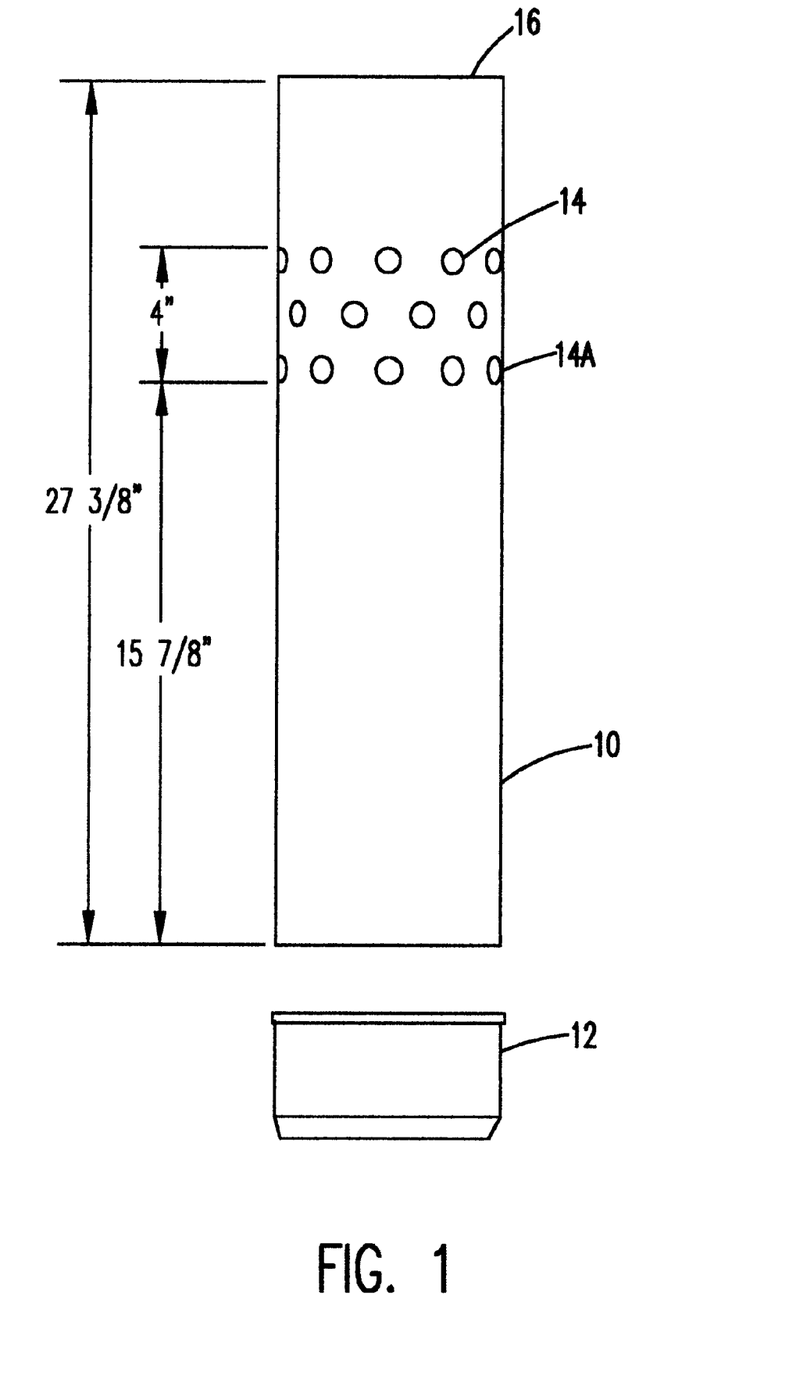
FIG. 1 shows a flow collar cylinder of the laminar flow collar of the present invention.

Referring now to the drawings, and more particularly to FIG. 1, there is shown a laminar flow collar cylinder of the laminar flow collar of the present invention Specifically, FIG. 1 show a laminar flow collar cylinder 10 having an open top end 16 and a plurality of holes 14 about the periphery thereof. At bottom end of the laminar flow collar cylinder 10 is a cap 12 which sits on a floor of the septic system (see FIG. 4). The holes 14 are preferably equally spaced apart from one another and are positioned so as to prevent suction from the dosing pump from suctioning the sludge at the bottom of the tank and scum at the surface of the effluent wastewater.

Still referring to FIG. 1, the laminar flow collar cylinder 10 and cap 12 are made of (polyvinlechloride) PVC; however, any other material suitable for a septic system may be used with the present invention. In this embodiment, there are three rows of holes 14 about the periphery of the laminar flow collar cylinder 10 which are arranged at a total distance of approximately four inches, with a bottommost row of holes 14a approximately 16 inches from the bottom of the laminar flow collar cylinder 10. The height of the laminar flow collar cylinder 10 is approximately 27½ inches with a diameter of approximately six inches. In one preferred embodiment, there are 40 holes each having a diameter of less than or equal to one inch but greater than or equal to ⅞ inch. This configuration is designed so that when the laminar flow collar of the present invention is positioned within the tank of a septic system, the holes 14 are located within the clear effluent, i.e., below the scum floating on the surface of the tank and above the solid waste or sludge settled at the bottom of the tank, thereby resulting in a laminar flow of the wastewater effluent.

As previously discussed, the dimensions discussed herein are not in any way limiting, and other dimensions may equally be used depending on the capacity of the septic system and the flow rate of the pump and the like. For example, one further embodiment of the present invention is designed to include 30 holes each having a diameter greater than or equal to ⅞ inches and a flow rate of 15 gallons per minute. However, it is noted that other flow rates as well as number of holes and diameters of holes may equally be used with the present invention such as, for example, an eight inch diameter laminar flow collar cylinder having 30 holes about a periphery thereof and each having a diameter of approximately 1.15 inches.

It is important to note that the configuration (e.g., dimensions of the holes and the like) may vary depending on the different effluent flow rates and other variables used in different septic systems. However, it is important to stress that the present invention may accommodate any system according to the examples provided below. Thus, different diameter and number of holes and the like are contemplated so long as the laminar flow collar of the present invention maintains a laminar flow within the septic system (e.g., a Reynolds Number of less than 2000).

Figure 2:
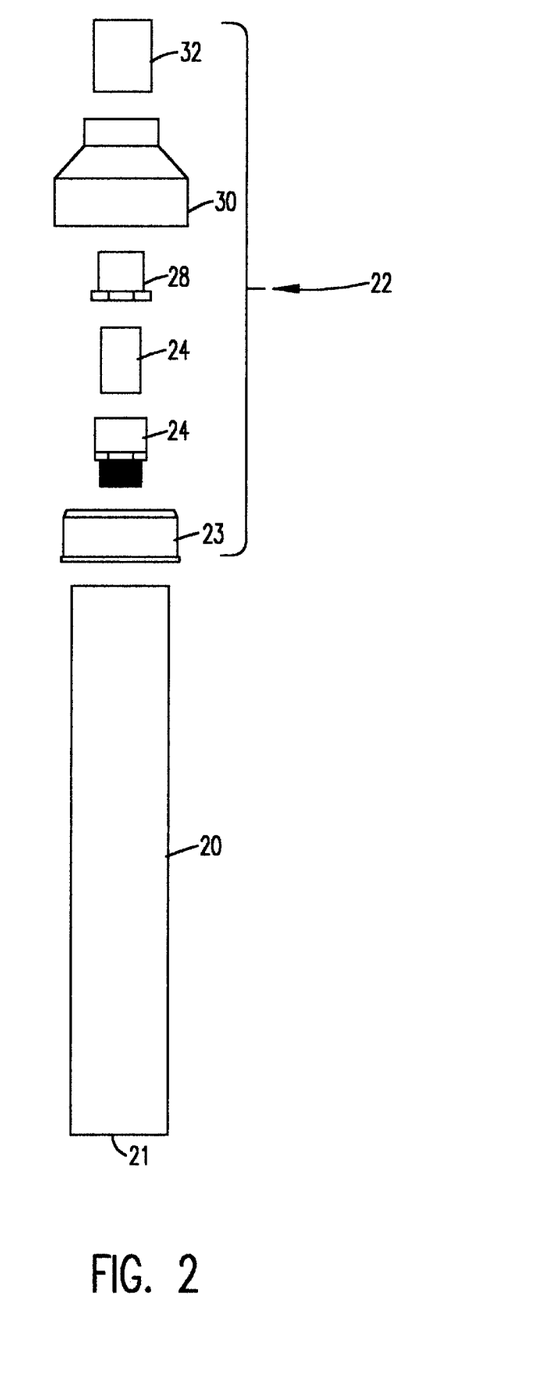
FIG. 2 shows a disassembled pump cylinder for housing a pump.

FIG. 2 shows a disassembled pump cylinder for housing a dosing pump. The pump cylinder 20 includes an open bottom end 21 and an assembly 22 coupled to the top portion of the pump cylinder 20. The diameter of the pump cylinder 20 is large enough to house a dosing pump therein but small enough to fit within the laminar flow collar cylinder 10. The assembly 22 includes a half coupling 23 and an adapter 24 coupled to the half coupling 23. A pipe 26 is coupled to the adapter 24. A pressure bushing 28 is fitted over the pipe 26 and a reducing coupling 30 is then fit over the entire assembly (e.g., half coupling 22, adapter 24, pipe 26 and pressure bushing 28) such that the pressure bushing 28 and pipe 26 extend into the upper portion of the reducing coupling 30. A coupling pipe 32 then extends from the reducing coupling 30 and leads to an effluent discharge. The pipe 26 may be coupled to an output of the dosing pump.

It is further noted that the assembly 22 as well as the cylinder 20 may also act as a cooling tower for the dosing pump. That is, the assembly 22 and the cylinder 20 provide for a uniform cooling of the dosing pump when inserted into the wastewater effluent. This prolongs the life of the dosing pump.

Still referring to FIG. 2, it is noted that the assembly 22 is not critical to the understanding of the present invention and is thus provided herein as one embodiment of the present invention. Thus, one of ordinary skill in the art would readily recognize that other assemblies 22 may be used with the present invention in order for the dosing pump to discharge the effluent from the septic system. By way of example, the present invention would work equally well with a flat cap for sealing the cylinder 20 instead of the half coupling 23 and the reducing coupling 30.

Figure 3A:
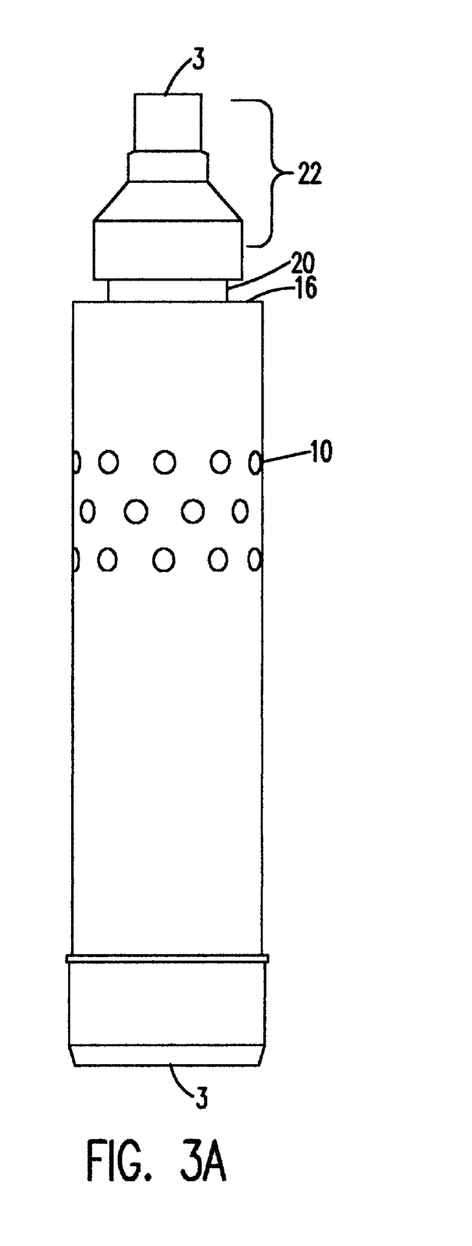
FIG. 3a shows an assembled laminar flow collar of the present invention.

FIG. 3a shows the assembled laminar flow collar of the present invention. As seen in FIG. 3, an upper portion of the pump cylinder 20 and the assembly 22 protrude from the open end 16 of the laminar flow collar cylinder 10. Although not shown, the coupling pipe 32 extends from the reducing coupling 30 and leads to an effluent discharge. The flow collar cylinder 10 may as a receptacle and a guide tube for the placement of the dosing pump within the tank.

Figure 3B:
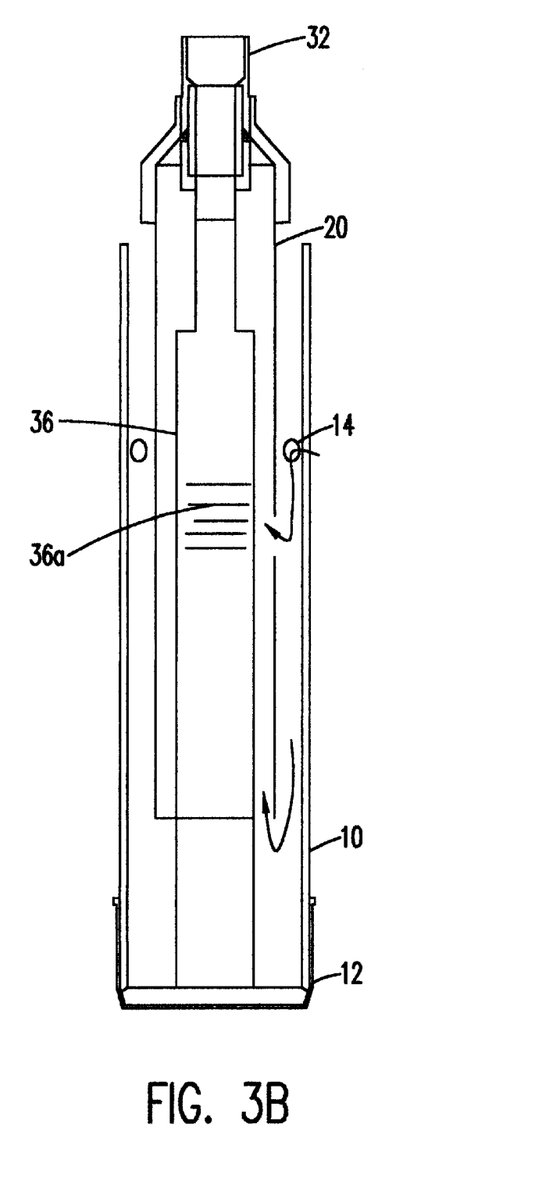

FIG. 3b shows a cross section of the laminar flow collar of the present invention along lines 3—3 of FIG. 3a. A dosing pump 36 is housed within the pump cylinder 20 such that a bottom of the dosing pump 36 rests on the cap 12 of the laminar flow collar cylinder 10. As wastewater effluent flows into the laminar flow collar cylinder 10 via the holes 14, the water is forced down the sides of the laminar flow collar cylinder 10 between the inner surface of the laminar flow collar cylinder 10 and the outer surface of the pump cylinder 20 via the pumping action of the dosing pump 36. The wastewater effluent then flows upward within the pump cylinder 20 between the inner surface of the pump cylinder 20 and the outer surface of the dosing pump 36. The pump cylinder 20 provides a reduced volume which increases the flow rate of the effluent at the bottom of the laminar flow collar cylinder 10 which ensures that particulate matter will not accumulate or settle at the bottom of the laminar flow collar cylinder 10 thus reducing the efficiency of the dosing pump. The wastewater effluent then flows into the input ports and impellers 36a of the dosing pump 36 for discharging into the absorption field via the coupling pipe 32.

Figure 4:
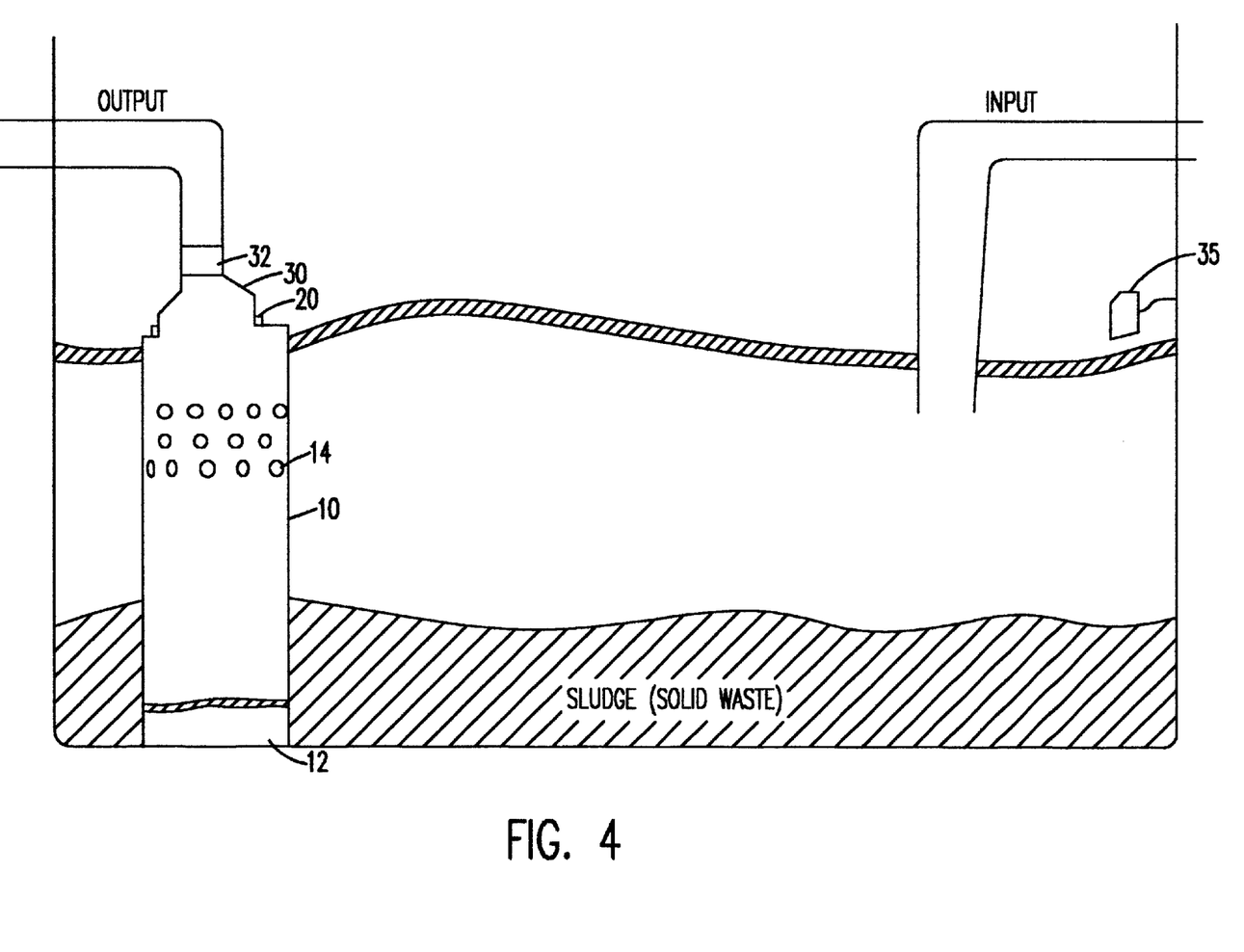
FIG. 4 shows the laminar flow collar of the present invention inserted in a septic system.

FIG. 4 shows the laminar flow collar of the present invention in a septic system, e.g., a septic tank or pump tank or the like. As seen in FIG. 4, the holes 14 of the laminar flow collar cylinder 10 are located in the clear effluent. That is, the holes 14 are located between the sludge settled at the bottom of the tank and the scum that is floating at the surface of the wastewater effluent. The level within the tank is controlled by a float valve 35.

In order to provide for a laminar flow using the laminar flow collar of the present invention, it is important to use the proper number of holes in combination with a proper diameter of each of the holes. By way of example, the following equations are used to show that particular embodiments of the laminar flow collar of the present invention may be used to provide a laminar flow within the pump tank or septic tank of the septic system. In these examples, it is assumed that the laminar flow collar of the present invention is used with wastewater temperature of approximately 15 degrees Celsius (or 59 degrees Fahrenheit). Of course, other temperature wastewater may equally be used the present invention, and that minor variations of the temperature of the wastewater will not affect the laminar flow of the wastewater as it flows through the laminar flow collar of the present invention.

It is further noted that the examples presented below are merely illustrative of several particular embodiments of the present invention and that other configurations (e.g., number and diameter of holes) of the laminar flow collar may equally be used, depending on such variables as the flow rate (gallons per minute) of the wastewater, the diameter of each hole and the like. Thus, the present invention is in no way limited to the illustrative examples presented below.

EXAMPLE I

FLOW RATE OF 25 GALLON PER MINUTE FLOW RATE

Figure 5:
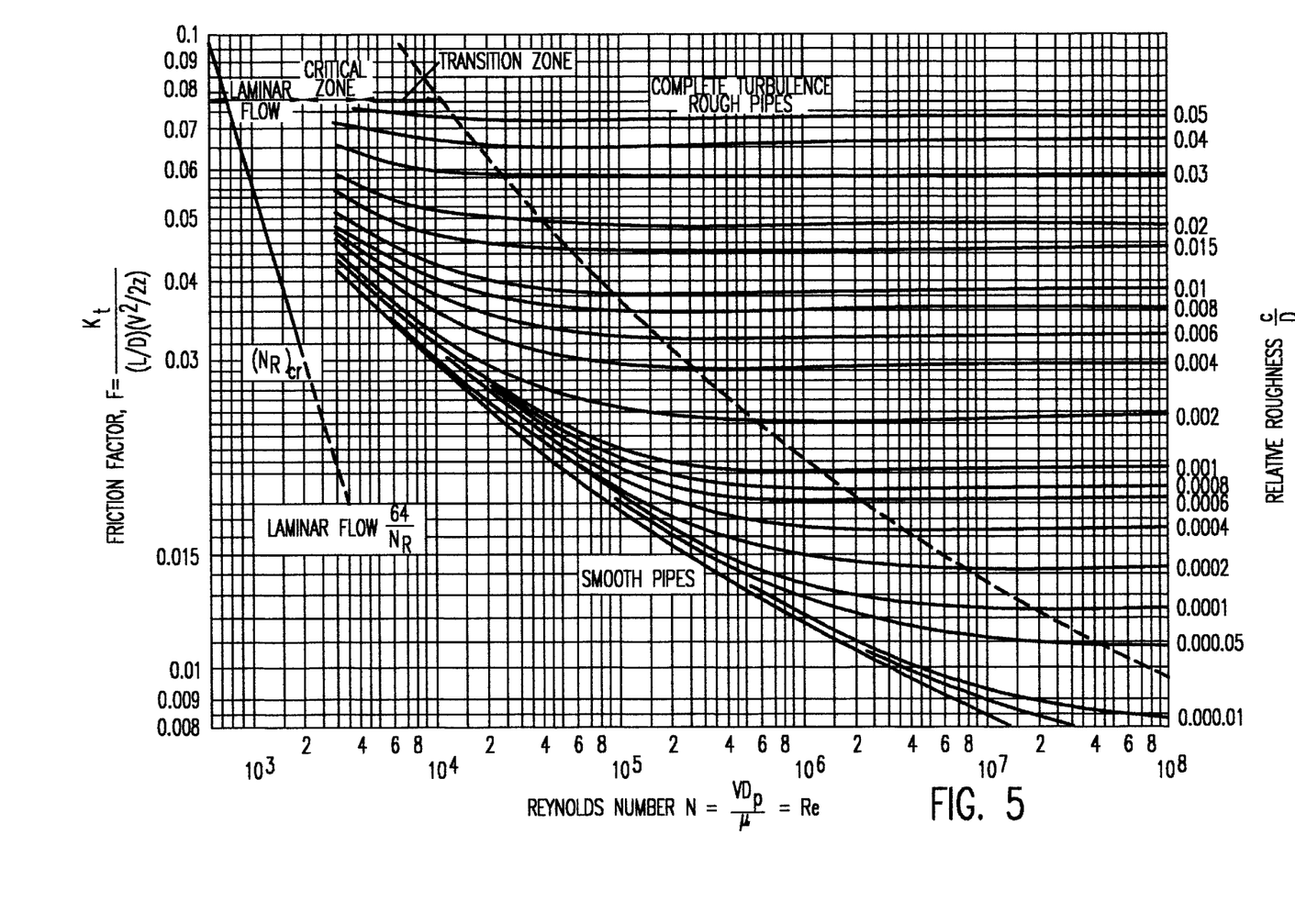
FIG. 5 shows a Moody Diagram charting laminar and turbulent flow conditions (Wastewater Engineering Treatment, Disposal & Reuse, Metcalfe & Eddy, Inc., $3^{rd}$ ed., pg. 1282).

The following is an example of equations used to determine proper hole diameters for maintaining a laminar flow in laminar flow collar cylinders having 30 holes, 40 holes and 42 holes, and which is used in a septic system having a flow rate of 25 gallons per minute. In these equations, (i) "D" represents the diameter of each of the holes in the laminar flow collar, (ii) 'Re' represents a Reynolds Number (a Re of less than 2000 represents laminar flow conditions) (See FIG. 5).

The following equations assume a wastewater temperature of approximately 15 degrees Celsius with a dynamic viscosity of $1.14 \times 10^{-3}$ N.S/m$^2$ and a density of 999 kg/m$^3$ (see Table I attached below) where $$\text{Reynold's Number} = Re = NR = \rho \frac{vD}{\mu} = \frac{\rho\left(\frac{Q}{A}\right)D}{\mu}$$

$$\text{Density} = \rho = 999 \frac{\text{kg}}{\text{m}^3} \text{ (see Table I attached below)}$$

$$V = \frac{Q}{A} = \frac{\frac{m^3}{S}}{m^2} = \frac{m}{s}$$

Laminar Flow Collar Having 30 Holes

The following equations are solved to determine the flow rate per hole of a laminar flow collar using 30 holes.

$$\text{flow rate per hole} = \frac{25 \text{ gpm}}{30 \text{ holes}} = 0.83 \frac{\text{gpm}}{\text{hole}}$$

$$0.83 \frac{\text{gal}}{\text{min}} \times \frac{1 \text{ft}^3}{7.48 \text{ gal}} \times \frac{(12 \text{ in})^3}{1 \text{ft}^3} \times \frac{(2.54 \text{ cm})^3}{1 \text{ in}^3} \times \frac{1 \text{ m}^3}{(100 \text{ cm})^3} \times \frac{1 \text{ min.}}{60 \text{ sec.}} =$$

$$5.24 \times 10^{-5} \frac{-}{h}$$

In order to determine the effective diameter for each of the holes in the 30 hole laminar flow collar of the present invention, the Reynolds Number is set equal to 2000 and the below equation is solved for "D", where "D" is the ideal diameter for each of the holes in the laminar flow collar using a 25 gallon per minute flow rate.

$$2000 = \frac{\left(999 \frac{\text{kg}}{\text{m}^3}\right)(D)\frac{\left(5.24 \times 10^{-5} \frac{m^3}{s}\right)}{\frac{\pi}{4}(D)^2}}{1.14 \times 10^{-3} \frac{\text{N.S}}{\text{m}^2}}$$

$$D = 0.02923 \text{ m} \times \frac{100 \text{ cm}}{1 \text{ m}} \times \frac{1 \text{ in.}}{2.54 \text{ cm}} = 1.15 \text{ inch}$$

It is thus found that each of the 30 holes should have a diameter of approximately 1.15 inches in order to provide a laminar flow in a septic system having a flow rate of 25 gallons per minute.

Laminar Flow Collar Having 40 Holes

The following equations are solved to determined the flow rate per hole of a laminar flow collar using 40 holes.

$$\text{flow rate per hole} = \frac{25 \text{ gpm}}{40 \text{ holes}} = 0.625 \frac{\text{gpm}}{\text{hole}}$$

$$Q = 0.625 \frac{\text{gal}}{\text{min}} \times \frac{1 \text{ft}^3}{7.48 \text{ gal}} \times \frac{(12 \text{ }\epsilon)^3}{1 \text{ft}^3} \times$$

$$\frac{(2.54 \text{ cm})^3}{1 \text{ in}^3} \times \frac{1 \text{ m}^3}{(100 \text{ )cm}^3} \times \frac{1 \text{ min.}}{60 \text{ sec.}} = 3.94 \times 10^{-5} \frac{\frac{m}{s}}{\text{hol}}$$

In order to determine the effective diameter for each of the holes in the 40 hole laminar flow collar of the present invention, the Reynolds Number is set equal to 2000 and the below equation is solved for "D", where "D" is the ideal diameter for each of the holes in the laminar flow collar using a 25 gallon per minute flow rate.

$$2000 = \frac{\left(999 \frac{\text{kg}}{\text{m}^3}\right)(D)\frac{\left(3.94 \times 10^{-5} \frac{m^3}{s}\right)}{\frac{\pi}{4}(D)^2}}{1.14 \times 10^{-3} \frac{\text{N.S}}{\text{m}^2}}$$

$$D = 0.02198 \text{ m} \times \frac{100 \text{ cm}}{1 \text{ m}} \times \frac{1 \text{ in.}}{2.54 \text{ cm}} = 0.865 \text{ inch}$$

It is thus found that each of the 40 holes should have a diameter of approximately 0.865 inches in order to provide a laminar flow in a septic system having a flow rate of 25 gallons per minute.

Laminar Flow Collar Having 42 Holes

By way of even further example, it is noted that 42 holes each having a diameter of ⅞ inches (0.02223 m) used with a 25 gallon per minute flow would also result in a laminar flow. The following equations confirm such a configuration of one embodiment of the present invention.

$$\text{flow rate per hole} = \frac{25 \text{ gpm}}{42 \text{ holes}} = 0.595 \frac{\text{gpm}}{\text{hole}}$$

$$= 0.595 \frac{\text{gal}}{\text{min}} \times \frac{1 \text{ft}^3}{7.48 \text{ gal}} \times \frac{(12 \text{ in})^3}{1 \text{ft}^3} \times$$

$$\frac{(2.54)\text{cm}^3}{1 \text{ in}^3} \times \frac{1 \text{ m}^3}{(100 \text{ cm})^3} \times \frac{1 \text{ min.}}{60 \text{ sec}} = 3754 \times 10^{-5} \frac{\frac{m}{-}}{\text{ho}}$$

$$Re = \frac{\left(999 \frac{\text{kg}}{\text{m}^3}\right)(0.02223 \text{ m})\frac{\left(3.75 \times 10^{-5} \frac{m^3}{s}\right)}{\frac{\pi}{4}(0.02223 \text{ m})^2}}{1.14 \times 10^{-3} \frac{\text{N.S}}{\text{m}^2}} = 1882$$

$$D = 0.02223 \text{ m} \times \frac{100 \text{ cm}}{1 \text{ m}} \times \frac{1 \text{ in.}}{2.54 \text{ cm}} = 0.875 \text{ inch}$$

Trial Tests for Laminar Flow Collar Using 40 Holes with ⅞ Inch and One Inch Diameter Holes The following equation verifies that a drill bit having a diameter of approximately ⅞ inch (0.02223 m) for drilling 40 holes (each having a corresponding diameter of 0.02223 m) in the laminar flow collar of the present invention would result in a laminar flow (Re<2000).

$$Re = \frac{\left(999 \frac{\text{kg}}{\text{m}^3}\right)(0.02223 \text{ m})\frac{\left(3.94 \times 10^{-5} \frac{m^3}{s}\right)}{\frac{\pi}{4}(0.02223 \text{ m})^2}}{1.14 \times 10^{-3} \frac{\text{N.S}}{\text{m}^2}} = 1978$$

The following equation verifies that a drill bit having a diameter of approximately one inch (0.02540 m) for drilling 40 holes (each having a corresponding diameter of 0.02540 m) in the laminar flow collar of the present invention would result in a laminar flow (Re<2000).

$$Re = \frac{\left(999 \frac{\text{kg}}{\text{m}^3}\right)(0.02540 \text{ m})\dfrac{\left(3.94 \times 10^{-5} \frac{\text{m}^3}{\text{s}}\right)}{\dfrac{\pi}{4}(0.02540 \text{ m})^2}}{1.14 \times 10^{-3} \dfrac{\text{N.S}}{\text{m}^2}} = 1731$$

EXAMPLE II

FLOW RATE OF 15 GALLON PER MINUTE FLOW RATE

By way of an additional example, the laminar flow collar of the present invention may work equally well with a flow rate of 15 gallons per minute and a laminar flow collar having 30 holes. In this example, each hole has a diameter of approximately 0.6917 inches (0.01757 m). The following equations assume that the temperature of the wastewater is approximately 15 degrees Celsius with a dynamic viscosity of $1.14 \times 10^{-3}$ N.S/m$^2$ and a density of 999 kg/m$^3$ (see Table I attached below) where $$\text{Density} = \rho = 999 \frac{\text{kg}}{\text{m}^3}$$

$$\text{Reynolds Number} = Re = NR = \frac{\rho v D}{\mu} = \frac{\rho\left(\frac{Q}{A}\right)D}{\mu}$$

$$V = \frac{Q}{A} = \frac{\frac{m3}{S}}{\text{m}^2}$$

The following equations are used to determine the flow rate of a laminar flow collar of the $$\text{flow rate per hole} = \frac{15 \text{ gpm}}{30 \text{ holes}} = 0.5 \frac{\text{gpm}}{\text{hole}}$$

$$= 0.5 \frac{\text{gal}}{\text{min}} \times \frac{1 \text{ft}^3}{7.48 \text{ gal}} \times \frac{(12 \text{ in})^3}{1 \text{ft}^3} \times$$

$$\frac{(2.54 \text{ cm})^3}{1 \text{ in}^3} \times \frac{1 \text{ m}^3}{(100)\text{cm}^3} \times \frac{1 \text{ min}}{60 \text{ sec}} = 3.15 \times 10^{-5} \frac{\frac{\text{m}}{\text{s}}}{\text{ho}}$$

In order to determine the effective diameter for each of the holes in the 30 hole laminar flow collar of the present invention, the Reynolds Number is set equal to 2000 and the below equation is solved for "D", where "D" is the ideal diameter for each of the holes in the laminar flow collar using a 15 gallon per minute flow rate.

$$2000 = \frac{\left(999 \frac{\text{kg}}{\text{m}^3}\right)(D)\dfrac{\left(3.15 \times 10^{-5} \frac{\text{m}^3}{\text{s}}\right)}{\dfrac{\pi}{4}(D)^2}}{1.14 \times 10^{-3} \dfrac{\text{N.S}}{\text{m}^2}}$$

$$D = 0.01757 \text{ m} \times \frac{100 \text{ cm}}{1 \text{ m}} \times \frac{1 \text{ in.}}{2.54 \text{ cm}} = 0.6917 \text{ inch}$$

It is thus found that each of the 30 holes should have a diameter of approximately 0.6917 inches in order to provide a laminar flow in a septic system having a flow rate of 15 gallons per minute.

Trial Tests for Laminar Flow Collar Using 30 Holes with 11/16 Inch and 3/4 Inch Diameter Holes The following equation verifies that a drill bit having a diameter of 11/16 inch (0.01746 m) for drilling 30 holes (each having a corresponding diameter of 0.01746 m) in the laminar flow collar of the present invention would not result in a laminar flow (Re<2000).

$$Re = \frac{\left(999 \frac{\text{kg}}{\text{m}^3}\right)(0.01746 \text{ m})\dfrac{\left(3.15 \times 10^{-5} \frac{\text{m}^3}{\text{s}}\right)}{\dfrac{\pi}{4}(0.01746 \text{ m})^2}}{1.14 \times 10^{-3} \dfrac{\text{N.S}}{\text{m}^2}} = 2013$$

However, a further trial test was performed to determine that a 3/4 inch (0.01905 m) drill bit would result in a laminar flow in an embodiment of the laminar flow collar of the present invention using 40 holes (each having a corresponding diameter of 0.01905 m).

$$Re = \frac{\left(999 \frac{\text{kg}}{\text{m}^3}\right)(0.01905 \text{ m})\dfrac{\left(3.15 \times 10^{-5} \frac{\text{m}^3}{\text{s}}\right)}{\dfrac{\pi}{4}(0.01905)^2}}{1.14 \times 10^{-3} \dfrac{\text{N.S}}{\text{m}^2}} = 1845$$

In the preferred illustrative examples, a drill bit of less than one inch but greater than or equal to 3/4 inches in the examples is preferred to be used in order to drill the holes in the laminar flow collar of the present invention. Thus, a laminar flow collar having either 40 holes or 42 holes (both used with a 25 gallon per minute flow rate) or a laminar flow collar having 30 holes (used with a 15 gallon per minute flow rate) is contemplated for use in the preferred embodiments of the present invention.

However, in further embodiments a laminar flow collar of the present invention may also use 30 holes each having a 1.15 inch diameter and the like (for a 25 gallon per minute flow rate). It is further noted that by using the above equations and knowing the temperature, density and viscosity of the wastewater as well as the Reynolds number and the like, one of skill in the art can easily determine other configurations of the laminar flow collar of the present invention which would provide a laminar flow. Moreover, the spacing between holes may vary, but in the preferred embodiments, the spacing between holes is approximately 0.92 inches for an eight inch diameter collar having 3 rows of 14 holes (total of 42 holes) (The spacing and amount of holes will vary depending on the diameter of the pipe.) The density and viscosity of the wastewater is determined from Table I below.

TABLE I

TABLE A.5
APPROXIMATE PHYSICAL PROPERTIES OF WATER° AT ATMOSPHERIC PRESSURE

| Temperature | Density | Specific weight | Dynamic viscosity | Kinematic viscosity | Vapor pressure |
|---|---|---|---|---|---|
| | kg/m$^3$ | N/m$^3$ | N · s/m$^2$ | m$^2$/s | N/m$^2$ abs. |
| 0° C. | 1000 | 9810 | $1.79 \times 10^{-3}$ | $1.79 \times 10^{-6}$ | 611 |
| 5° C. | 1000 | 9810 | $1.51 \times 10^{-3}$ | $1.51 \times 10^{-6}$ | 872 |
| 10° C. = 50° F. | 1000 | 9810 | $1.31 \times 10^{-3}$ | $1.31 \times 10^{-6}$ | 1230 |
| 15° C. = 59° F. | 999 | 9800 | $1.14 \times 10^{-3}$ | $1.14 \times 10^{-6}$ | 1700 |
| 20° C. | 998 | 9790 | $1.00 \times 10^{-3}$ | $1.00 \times 10^{-6}$ | 2340 |
| 25° C. | 997 | 9781 | $8.91 \times 10^{-4}$ | $8.94 \times 10^{-7}$ | 3170 |
| 30° C. | 996 | 9771 | $7.97 \times 10^{-4}$ | $8.00 \times 10^{-7}$ | 4250 |
| 35° C. | 994 | 9751 | $7.20 \times 10^{-4}$ | $7.24 \times 10^{-7}$ | 5630 |
| 40° C. | 992 | 9732 | $6.53 \times 10^{-4}$ | $6.58 \times 10^{-7}$ | 7380 |
| 50° C. | 988 | 9693 | $5.47 \times 10^{-4}$ | $5.53 \times 10^{-7}$ | 12,300 |
| 60° C. | 983 | 9643 | $4.66 \times 10^{-4}$ | $4.74 \times 10^{-7}$ | 20,000 |
| 70° C. | 978 | 9594 | $4.04 \times 10^{-4}$ | $4.13 \times 10^{-7}$ | 31,200 |
| 80° C. | 972 | 9535 | $3.54 \times 10^{-4}$ | $3.64 \times 10^{-7}$ | 47,400 |
| 90° C. | 965 | 9467 | $3.15 \times 10^{-4}$ | $3.26 \times 10^{-7}$ | 70,100 |
| 100° C. | 958 | 9398 | $2.82 \times 10^{-4}$ | $2.94 \times 10^{-7}$ | 101,300 |
| | slugs/ft$^3$ | lbf/ft$^3$ | lbf-s/ft$^3$ | ft$^2$/s | psis |
| 40° F. | 1.94 | 62.43 | $3.23 \times 10^{-5}$ | $1.66 \times 10^{-5}$ | 0.122 |
| 50° F. | 1.94 | 62.40 | $2.73 \times 10^{-5}$ | $1.41 \times 10^{-5}$ | 0.178 |
| 60° F. | 1.94 | 62.37 | $2.36 \times 10^{-5}$ | $1.22 \times 10^{-5}$ | 0.256 |
| 70° F. | 1.94 | 62.30 | $2.05 \times 10^{-5}$ | $1.06 \times 10^{-5}$ | 0.363 |
| 80° F. | 1.93 | 62.22 | $1.80 \times 10^{-5}$ | $0.930 \times 10^{-5}$ | 0.506 |
| 100° F. | 1.93 | 62.00 | $1.42 \times 10^{-5}$ | $0.739 \times 10^{-5}$ | 0.949 |
| 120° F. | 1.92 | 61.72 | $1.17 \times 10^{-5}$ | $0.609 \times 10^{-5}$ | 1.69 |
| 140° F. | 1.91 | 61.38 | $0.981 \times 10^{-5}$ | $0.514 \times 10^{-5}$ | 2.89 |
| 160° F. | 1.90 | 61.00 | $0.838 \times 10^{-5}$ | $0.442 \times 10^{-5}$ | 4.74 |
| 180° F. | 1.88 | 60.58 | $0.726 \times 10^{-5}$ | $0.385 \times 10^{-5}$ | 7.51 |
| 200° F. | 1.87 | 60.12 | $0.637 \times 10^{-5}$ | $0.341 \times 10^{-5}$ | 11.53 |
| 212° F. | 1.86 | 59.83 | $0.593 \times 10^{-5}$ | $0.319 \times 10^{-5}$ | 14.70 |

(Engineering Fluid Dynamics, Roberson/Crowe, 4$^{th}$ ed., App. A-24)

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A laminar flow collar adapted for use in a septic system having a dosing pump, the laminar flow collar comprising:
   a laminar flow collar cylinder having spaced apart holes, the spaced apart holes having a predetermined diameter which match a pump flow rate of the dosing pump thereby maintaining a laminar flow of effluent flowing within the laminar flow collar cylinder; and
   a pump cylinder for housing the dosing pump, wherein the laminar flow collar cylinder acts as a receptacle for the dosing pump in the pump cylinder and a guide for proper placement of the dosing pump within a tank.

2. The laminar flow collar of claim 1, wherein the pump cylinder and the laminar flow collar cylinder form a reduced volume area within the laminar flow collar cylinder, the reduced volume area increases a flow rate of the effluent flowing within the laminar flow collar cylinder in order to prevent particulate matter from settling or accumulating at a bottom of the laminar flow collar cylinder.

3. The laminar flow collar of claim 1, wherein:
   the effluent has a flow rate of 25 gallons per minute;
   the spaced apart holes have a diameter greater than approximately ⅞ inches but less than approximately 1.15 inches; and
   the spaced apart holes include one of 30, 40 and 42 holes.

4. The laminar flow collar of claim 3, wherein the spaced apart holes have a diameter of between the range of approximately ⅞ inch to one inch and the spaced apart holes include 40 or 42 holes.

5. The laminar flow collar of claim 3, wherein the spaced apart holes have a diameter of approximately 1.15 inches and the spaced apart holes include 30 holes.

6. The laminar flow collar of claim 1, wherein:
   the effluent has a flow rate of 15 gallons per minute;
   the spaced apart holes have a diameter of approximately ¾ inches; and
   the spaced apart holes include 30 holes.

7. The laminar flow collar of claim 1, wherein the spaced apart holes are located at a certain height such that when the laminar flow collar cylinder is placed in a dosing tank the spaced apart holes are located within clear effluent which is between solid waste settled at a bottom of the dosing tank and scum floating on a surface of the clear effluent.

8. The laminar flow collar of claim 1, wherein the spaced apart holes maintain a laminar flow of the effluent flowing within the laminar flow collar cylinder at a range of flow rates.

9. The laminar flow collar of claim 1, wherein the spaced apart holes are evenly spaced apart from one another.

10. The laminar flow collar of claim 1, wherein the spaced apart holes include multiple rows about a periphery of the laminar flow collar cylinder.

11. A laminar flow collar adapted for use in a septic system having a dosing pump, the laminar flow collar comprising:

a laminar flow collar cylinder having spaced apart holes, the spaced apart holes having a predetermined diameter which match a pump flow rate of the dosing pump thereby maintaining a laminar flow of effluent flowing within the laminar flow collar cylinder; and means for uniformly cooling the dosing pump, the cooling means being a pump cylinder which houses the dosing pump within the laminar flow collar cylinder.

12. A laminar flow collar adapted for use in a septic system having a dosing pump, the laminar flow collar comprising:

a laminar flow collar cylinder having spaced apart holes, the spaced apart holes having a predetermined diameter which match a pump flow rate of the dosing pump; and a pump cylinder for housing the dosing pump, the pump cylinder fitting partially within the laminar flow collar cylinder, wherein effluent in the septic system flows in a laminar manner through the spaced apart holes in response to suction created from the dosing pump, the spaced apart holes are at a height on the laminar flow collar cylinder such that the spaced apart holes are located within clear effluent when the laminar flow collar cylinder is in a dosing tank.

13. The flow collar of claim 12, wherein:

the dosing pump rests at a bottom of the laminar flow collar cylinder, the pump cylinder and the laminar flow collar cylinder form a reduced volume area within the laminar flow collar cylinder, the reduced volume area increases a flow rate of the effluent flowing within the laminar flow collar cylinder such that particulate matter is prevented from settling or accumulating at the bottom of the laminar flow collar cylinder and clogging the dosing pump.

14. The laminar flow collar of claim 12, wherein the location of the spaced apart holes allows for settling of solid waste and sludge at a bottom of the laminar flow collar cylinder.

15. The laminar flow collar of claim 12, wherein the pump cylinder is a cooling tower for cooling the dosing pump within the laminar flow collar cylinder.

16. The laminar flow collar of claim 12, wherein:

the effluent has a flow rate of 25 gallons per minute;

the spaced apart holes have a diameter between the range of approximately ⅞ inch to one inch; and the spaced apart holes include 40 or 42 holes.

17. The laminar flow collar of claim 12, wherein:

the effluent has a flow rate of 25 gallons per minute; and the spaced apart holes have a diameter of approximately 1.15 inches; and the spaced apart holes include 30 holes.

18. The laminar flow collar of claim 12, wherein:

the effluent has a flow rate of 15 gallons per minute;

the spaced apart holes have a diameter of approximately ¾ inches; and the spaced apart holes include 30 holes.

* * * * *